Figure 1:
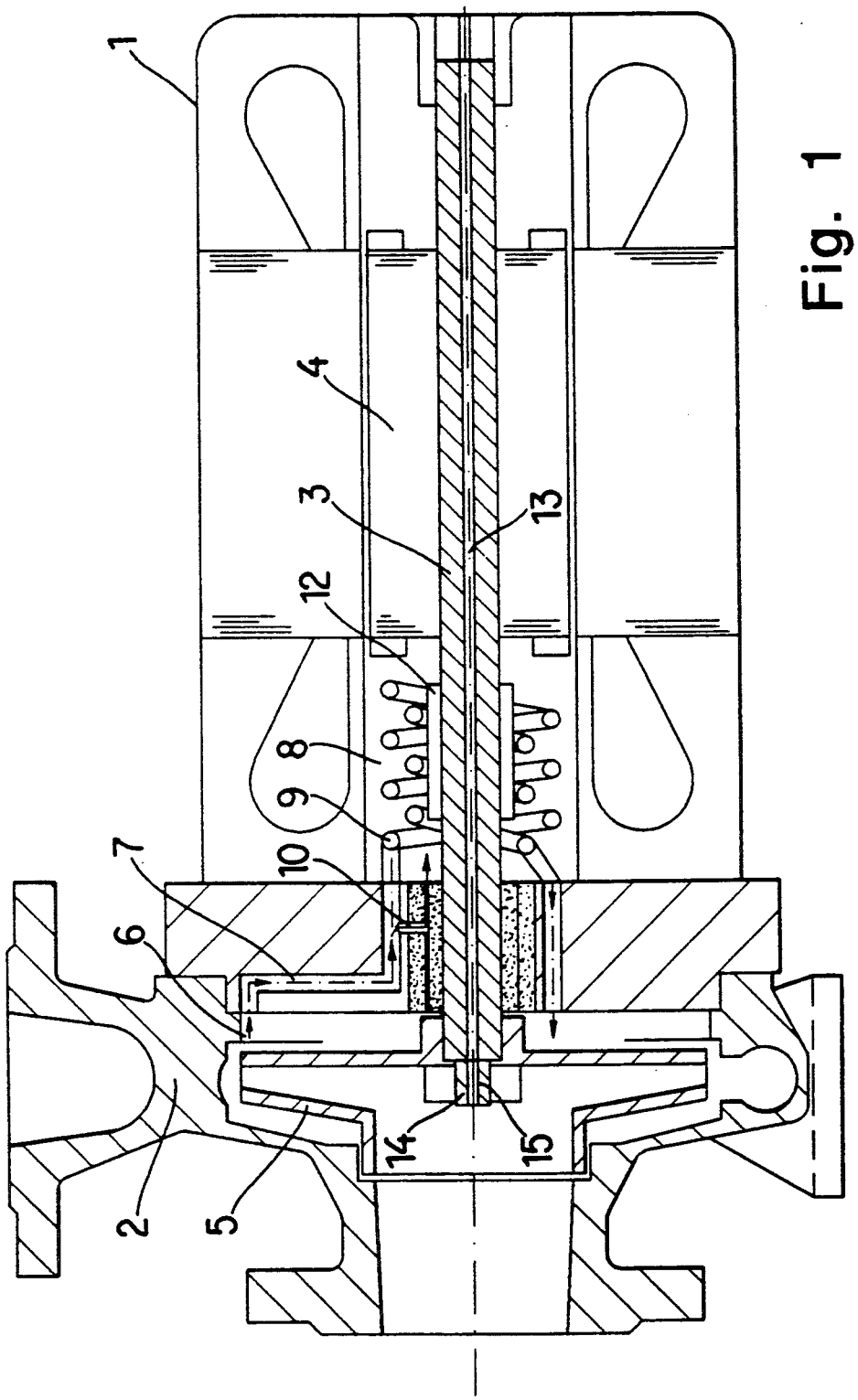

United States Patent [19]

Rupprecht

[11] Patent Number: 5,144,177
[45] Date of Patent: Sep. 1, 1992

[54] CANNED MOTOR PUMP WITH HEAT EXCHANGER IN ROTOR CHAMBER

[75] Inventor: Peter Rupprecht, Bayreuth, Fed. Rep. of Germany

[73] Assignee: KSB Aktiengesellschaft, Frankenthal/Pfalz, Fed. Rep. of Germany

[21] Appl. No.: 671,773

[22] PCT Filed: Oct. 10, 1989

[86] PCT No.: PCT/EP89/01195

§ 371 Date: Apr. 12, 1991

§ 102(e) Date: Apr. 12, 1991

[87] PCT Pub. No.: WO90/04279

PCT Pub. Date: Apr. 19, 1990

[30] Foreign Application Priority Data

Oct. 12, 1988 [DE] Fed. Rep. of Germany ....... 3834668

[51] Int. Cl.⁵ ............................................. H02K 9/197
[52] U.S. Cl. ........................................ 310/86; 310/57;
310/64; 415/175; 415/176; 417/370
[58] Field of Search ............... 310/54, 64, 86, 104;
415/180, 110, 111, 112, 175, 176, 177; 417/366,
669, 370, 373

[56] References Cited

U.S. PATENT DOCUMENTS

| | | |
|---|---|---|
| 2,938,131 | 5/1960 | Maynard ..................... 310/87 |
| 3,143,676 | 8/1964 | Niemkiewicz ................ 310/86 |
| 3,469,126 | 9/1969 | Wiedemann .................. 310/54 |
| 3,744,935 | 7/1973 | Magni ........................ 417/370 |
| 4,644,210 | 2/1987 | Meisner et al. .............. 310/54 |
| 4,652,218 | 3/1987 | Tsutsui et al. .............. 310/208 |
| 4,814,653 | 3/1989 | Hasegawa et al. ............ 310/90 |
| 5,034,644 | 7/1991 | Kech ......................... 310/54 |
| 5,039,284 | 8/1991 | Talaski ...................... 417/366 |
| 5,055,006 | 8/1991 | Kobayashi et al. ........... 417/366 |

FOREIGN PATENT DOCUMENTS

| | | |
|---|---|---|
| 649719 | 12/1964 | Belgium . |
| 1488433 | 4/1969 | Fed. Rep. of Germany . |
| 2006681 | 9/1970 | Fed. Rep. of Germany . |
| 3150724 | 7/1983 | Fed. Rep. of Germany . |

*Primary Examiner*—Steven L. Stephan
*Assistant Examiner*—D. L. Rebsch
*Attorney, Agent, or Firm*—Peter K. Kontler

[57] ABSTRACT

The rotor of a canned motor for a centrifugal pump is cooled by a heat-exchanger installed in the rotor chamber and receives liquid from the plenum chamber of the pump or from another source. Liquid entering the rotor chamber can leak therefrom by way of a flow-restricting outlet (at 10). The outlet permits gases to escape from the rotor chamber when the motor is started, but limits the leakage of liquid from the rotor chamber. Leaking liquid is admitted into the suction chamber of the pump.

8 Claims, 2 Drawing Sheets

CANNED MOTOR PUMP WITH HEAT EXCHANGER IN ROTOR CHAMBER

The heat developed in canned motors due to power loss is conventionally removed by a fluid stream which is conducted through the rotor chamber. The fluid stream is either branched off from the stream being conveyed by the centrifugal pump or is generated by an impeller provided for this purpose.

If the fluid conducted through the rotor chamber is explosive, it is necessary to provide safeguards which are prescribed by relevant codes. Above all, explosion protection clearances are to be arranged in the flow path of the fluid conducted through the rotor chamber.

An electric, submersible pump aggregate for containers with explosive or other dangerous fluids is disclosed in the German Offenlegungsschrift 2 006 681 and has a winding which is immersed in the fluid being conveyed. Overheating of the electric motor is prevented by maintaining fluid circulation in the electric motor during pump operation. To achieve complete sealing of the electric, submersible pump aggregate from the surroundings, the wires of the winding of the electric motor are provided with a coating resistant to the fluid being conveyed and are extended to such a degree that their ends can pass through seals to a junction box externally of the container. Since the container is an integral part of the protective measure, such measure can be used only for a submersible pump disposed in a container.

Another known safety measure is the encapsulation of the stator chamber so as to be pressure-resistant. In view of attempts to increase safety, and in view of distinct regulations relating to auxiliary protection, it is necessary to additionally monitor the rotor chamber during operation when the above-mentioned measures are put into effect.

When a fluid not originally intended for this purpose is conveyed through a canned motor, several problems arise aside from the possibility that this fluid is not well-suited for cooling. If this fluid contains solids, for example, fouling, obstruction of clearances, increased wear and other undesired consequences can occur. The disposition of filtering devices before the rotor chamber of the canned motor often only alleviates this problem temporarily. Since inadequate monitoring and maintenance of the filtering devices can cause blockage of the fluid flow, there is a danger here that the canned motor will receive an insufficient supply of cooling fluid. Inasmuch as the canned motor requires a continuous cooling stream, such a shortage will lead to failure of the canned motor within a short period.

To counteract the danger that, due to continuous passage of the fluid being conveyed, solid particles will enter the electric motor, the Belgian patent application 649 719 suggests a procedure in which the electric motor is filled with the fluid being conveyed one time and circulation between the pump chamber and motor chamber is then discontinued. However, since the canned motor pump proposed here is to be used mainly for the conveying of hot water, no additional measures for cooling or explosion protection are provided.

A danger exists for canned motors used as a drive for centrifugal pumps serving to convey explosive fluids, fluids which readily liberate gas or fluids near their boiling point. The conveyed fluid admitted into the rotor chamber from the pressure side of the centrifugal pump is progressively expanded and heated on its way through the rotor chamber before flowing off to the suction side of the centrifugal pump. There is the danger that the fluid will vaporize or liberate gas and that the flash point will be exceeded. This can lead to dry operation of the bearings and failure of the aggregate.

It is an object of the invention to provide a canned motor which has a pressure-resistant casing and which, for cooling of the rotor chamber, does not require passage of the fluid in contact with the driven machine.

According to the invention, the object set forth is achieved by a heat-exchanger which is disposed in the rotor chamber of the canned motor and has a fluid from externally of the rotor chamber flowing therethrough. An opening is arranged at the outlet of the rotor chamber and has a size such that, on the one hand, venting of the rotor chamber upon start-up of the canned motor is assured while, on the other hand, the flow of fluid is limited to the minimum attainable.

By virtue of the design in accordance with the invention, the heat due to power loss in the motor is no longer removed directly, that is, by a possibly contaminated medium passing through the rotor chamber. Indirect removal of the heat via a heat-exchanger has the advantage that the cooling medium does not contact the rotor chamber any longer. This allows various cooling media to be used such as, for example, a contaminated, unfiltered fluid being conveyed or a fluid which is particularly suitable for cooling and can even be a gas. The additional feature of an opening at the outlet of the rotor chamber which permits venting of the rotor chamber while restricting flow to the minimum achievable assures filling of the rotor chamber with fluid as required for operation and prevents a pressure drop, and thus vaporization, within the rotor chamber. The amount of fluid flowing through when the motor begins operating approximates that from a larger, controlled leak. Plugging of the narrow opening at the outlet of the rotor chamber following venting has no detrimental effects because fluid need no longer flow through the rotor chamber once the latter has been filled and vented. It is actually of advantage for the opening to be closed after venting.

To improve heat removal, it can be beneficial to agitate the fluid in the rotor chamber by means of a device on the rotor shaft. For example, protrusions disposed on the rotor shaft in the vicinity of the heat-exchanger can be used for this purpose.

From the German Offenlegungsschrift 1 488 433, it is known, in principle, to cool the winding of an electric machine by means of a heat-exchanger. Here, however, the electric machine is a turbogenerator having a rotor chamber which is under vacuum. The heat-exchanger is constituted by cooling pipes which are mounted on the inner side of the cylindrical casing forming the air gap. For a canned motor, which is subjected to different electrical conditions, a comparable arrangement on the inner side of the casing would not be allowable.

Figure 3:
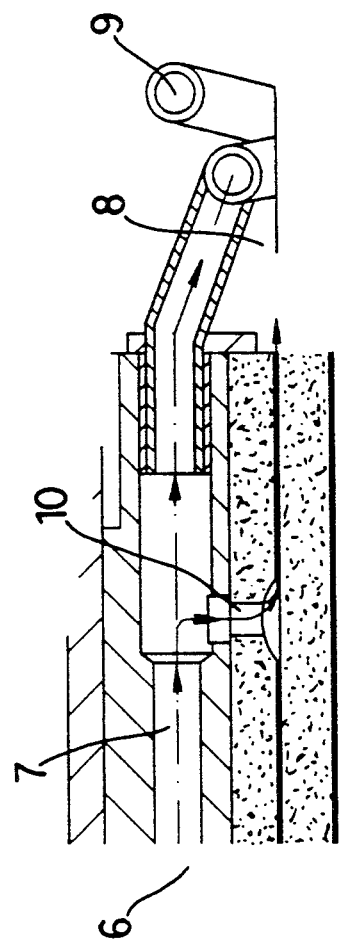
Figure 2:
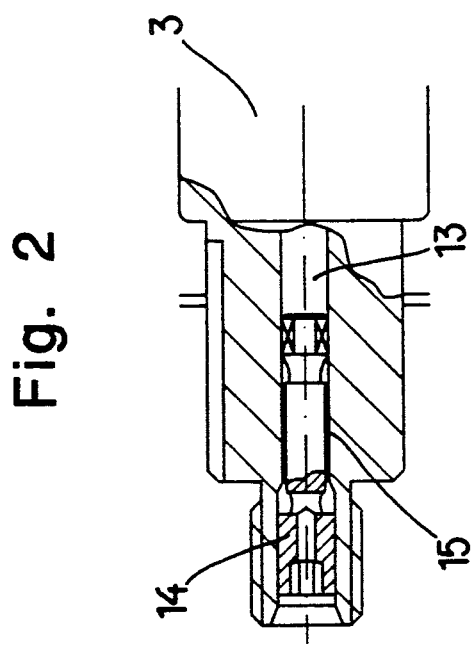

The invention is described in greater detail with reference to an exemplary embodiment. The drawing shows in FIG. 1 a sectional view of a canned motor pump; in FIG. 2 a segment of the canned motor pump of FIG. 1 taken from the region of the pump impeller; and FIG. 3 a segment of the canned motor pump of FIG. 1 taken from the region of the heat-exchanger.

A canned motor 1 is connected to a centrifugal pump 2 by means of a common, hollow shaft 3. Thus, the hollow shaft 3 carries the rotor 4 of the canned motor 1, on the one hand, and the impeller 5 of the centrifugal pump 2, on the other hand.

A channel 7 extends from the pressure chamber 6 of the centrifugal pump 2 into the canned motor 1 where the channel 7 branches. A heat-exchanger 9 disposed in the rotor chamber 8 is fed via one branch of the channel 7 while the other branch leads, via a bore 10, into the portion of the rotor chamber 8 which is filled with fluid.

The heat-exchanger 9, which surrounds the hollow shaft 3, opens into an area of the pressure chamber 6 where the pressure is lower than at the entrance to the channel 7. The fluid being conveyed accordingly flows continuously through the heat-exchanger 9. To improve heat removal from the rotor chamber 8, protrusions 12 are situated on the periphery of the hollow shaft 3 and serve to agitate the fluid in the rotor chamber 8.

The branch stream conducted into the rotor chamber 8 arrives at the passage 13 of the hollow shaft 3 via the bearing and explosion protection clearances of the canned motor 1 and is likewise guided to the suction side of the centrifugal pump 2. An insert 14 is screwed into the opening of the passage 13 and defines a gap 15. The gap 15 is very narrow so that, on the one hand, it satisfies the explosion protection requirements and, on the other hand, generates such a great throttling effect that the flow through the rotor chamber 8 is limited to a minimum. This allows a pressure, which approximates the pressure in the pressure chamber 6 of the centrifugal pump 2, to develop in the rotor chamber 8. When the canned motor pump is started, the rotor chamber 8 is vented via the gap 15. Furthermore, the throttling effect of the gap 15 which greatly limits flow restricts the entry of solid particles possibly contained in the fluid being conveyed. In addition, a pressure drop at constrictions of the rotor chamber 8, which brings with it the danger of vaporization, is eliminated.

An eventual, and even desired, occurrence is the blockage of the gap 15 which takes place after a period of time, depending upon the nature of the medium being conveyed, and prevents additional flow through the rotor chamber 8. Since, by virtue of the indirect cooling of the rotor chamber 8 the flow through the latter serves only for venting, and continued flow is not necessary for the further operation. Any other cooling medium can be conducted through the heat-exchanger 9 instead of the fluid being conveyed.

I claim:

1. A canned motor for a fluid flow machine designed to convey explosive liquids, comprising a sealed housing defining a rotor chamber having a flow restricting outlet for evacuation of gases in response to admission of liquid into said chamber; a rotor disposed in said chamber and arranged to drive the fluid flow machine; heat-exchanger means in said chamber defining a path for the flow of a heat-exchange medium; and means for admitting a heat-exchange medium into said path, said admitting means extending from said chamber.

2. The motor of claim 1, further comprising a source of heat-exchange medium which supplies heat-exchange medium to said admitting means.

3. The motor of claim 2, wherein said source is the fluid flow machine.

4. The motor of claim 1, wherein said rotor includes means for agitating liquid in said chamber.

5. The motor of claim 4, wherein said rotor includes a shaft and said agitating means is provided on said shaft.

6. The motor of claim 5, wherein said shaft has a peripheral surface and said agitating means includes at least one protuberance extending from said peripheral surface.

7. The motor of claim 1, wherein said outlet is configurated and dimensioned to minimize leakage of liquid from said chamber.

8. The motor of claim 1, wherein said rotor includes a shaft and said heat-exchanger means surrounds said shaft.

* * * * *